US006317566B1

(12) United States Patent
Kagaya et al.

(10) Patent No.: US 6,317,566 B1
(45) Date of Patent: Nov. 13, 2001

(54) ELECTRONIC FLASH DEVICE FOR PHOTOGRAPHIC CAMERA

(75) Inventors: Masato Kagaya; Yukitsugu Hata; Hirokazu Yokoo, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/533,673

(22) Filed: Mar. 23, 2000

(30) Foreign Application Priority Data

Mar. 24, 1999 (JP) ................................................ 11-079226

(51) Int. Cl.[7] .................................................... G03B 15/03

(52) U.S. Cl. .......................... 396/176; 396/203; 396/206; 396/267

(58) Field of Search .................................... 396/203, 202, 396/206, 205, 176, 267; 315/120, 129, 241 P

(56) References Cited

U.S. PATENT DOCUMENTS

| | | | | |
|---|---|---|---|---|
| 4,394,079 | | 7/1983 | Takematsu | 396/206 X |
| 5,187,410 | | 2/1993 | Shimizu et al. | 315/241 P |
| 5,410,378 | | 4/1995 | Tasaka et al. | 396/6 |
| 5,780,976 | | 7/1998 | Matsuo | 315/241 P |
| 5,966,552 | * | 10/1999 | Hata | 396/206 |
| 6,091,906 | * | 7/2000 | Hata | 396/206 |

FOREIGN PATENT DOCUMENTS

| | | | |
|---|---|---|---|
| 3310262A1 | | 11/1983 | (DE) . |
| 1039786A1 | * | 9/2000 | (EP) . |
| 10096983 | | 4/1998 | (JP) . |

* cited by examiner

*Primary Examiner*—W. B. Perkey
(74) *Attorney, Agent, or Firm*—Young & Thompson

(57) ABSTRACT

An electronic flash device equipped with LED indicator for providing an indication of completion of charging a main capacitor and a circuit for lowering power consumption has a controlling transistor operative to control a base current of the oscillating transistor which increases or decreases a primary current flowing through a primary winding and to be turned conductive by a current supplied from a battery through a current limiting resistor to start supply of the base current of the oscillating transistor. A secondary current generated in a secondary winding increases the base current of the controlling transistor, which increases the base current of the oscillating transistor which is lowered by the current limiting resistor having a large resistance and is increased or decreased by the controlling transistor. The electronic flash device can lower the power consumption as compared to the conventional devices which use a tertiary winding to increase or decrease the base current of the oscillating transistor. A tertiary winding of the electronic flash device is solely used for turning on LED.

4 Claims, 6 Drawing Sheets

ELECTRONIC FLASH DEVICE FOR PHOTOGRAPHIC CAMERA

BACKGROUND OF THE INVENTION

1. Field of the Invention

The present invention relates to an electronic flash device for a photographic camera, and, more particularly, to an electronic flash device with law specific power consumption for a camera.

2. Description Related to the Prior Art

Cameras and lens-fitted film units have built-in electronic flashes for convenience of taking pictures indoors or under law ambient subject brightness. Such an electronic flash device has a need of charging a main capacitor up to a specified charged level of voltage. When the main capacitor is completely charged up, a neon lamp connected to both terminals of the main capacitor is energized or turned on to emit light for providing an indication that the electronic flash device is ready to flash. An electronic flash device equipped with a light emitting diode (which is hereinafter referred to as LED) as used for an indicator instead of the neon lamp has been proposed in, for example, Japanese Unexamined Patent Publication No. 8-115796 filed by the same applicant of this application and placed on the market, the LED needs a build-up voltage of 1.8 or higher to turn on and emit light. However, electromotive force of a battery that is usually used in cameras and lens-fitted film units is about 1.5 volts which is too low to energize directly the LED. The electronic flash device disclosed in the above mentioned publication energizes the LED with a voltage that is provided by a blocking oscillator that is constituted by an oscillating transistor and an oscillating transformer and well known in various form to those in the art. Reference is made to FIG. 6 for the purpose of providing a brief background that will enhance an understanding of the operation of a circuit of the electronic flash device disclosed in the above-mentioned publication.

Referring to FIG. 6, the electronic flash device includes a blocking oscillator that is comprised of an oscillating transistor 60 and an oscillating transformer 61. The oscillating transistor 60 repeatedly increases/decreases a primary current I1 which flows through a primary winding 61*a* of the oscillating transformer 61 so as to generate an electromotive force and a counter electromotive force across secondary and third windings 61*b* and 61*c*, respectively. When an electromotive force builds up, a main capacitor 63 is charged with a secondary current I2 which flows through a rectifier diode 62 from the secondary winding 61*b*. While a charging switch 64 remains turned on or closed, a battery 66 can start to supply current I0 through a resistor 65 and the third winding 61*c* of the oscillating transformer 61 to a base of the transistor 60, as a result of which the transistor 60 is turned conductive to admit the primary current I1 to flow therthrough. This causes the secondary and third windings 61*b* and 61*c* to produce the secondary and third currents 12 and 13, respectively. These currents I2 and I3 are added to the current I0 supplied originally from the battery 66 with the result of increasing the base current of the oscillating transistor 60, which leads to a further increase in the primary current I1, so that the base current reaches a peak current instantaneously due to a further increase in the secondary current I2. On the other hand, when the primary current I1 reaches a peak level and then stops increasing, each winding, 61*a,* 61*b* and 61*c* generates a counter electromotive force which is opposite in direction to the electromotive force. The counter electromotive force across the secondary and third windings 61*b* and 61*c* cause a reduction in the base current of the oscillating transistor 60, which results in a reduction in the primary current I1 correspondingly. In consequence, there occurs a further increase in the counter electromotive force, which leads an instantaneous reduction in the base current to a bottom level. As a result, when the counter electromotive force disappears, the oscillating transistor 60 is brought into conductive, so as to repeat the same operation.

As described above, the LED 67 for providing an indication of completion of charging a main capacitor is connected to both ends of the tertiary winding 61*c* which gives ON/OFF oscillation to the transistor 60 by amplifying the amplitude of a base current of the transistor 60 with a current which is generated as a current 13 when electromotive force is generated across the tertiary winding 61*c* or as a current (−I3) opposite in direction to the current I3 when counter electromotive force is generated across the tertiary winding 61*c*. In order to energize LED 67 to emit light when the main capacitor 63 attains a specified charged voltage, the utilization is made of a potential present at one of the opposite ends of the tertiary winding 61*c* that changes in proportional to a charged voltage of the main capacitor 63.

In the case where, although it has no concern in installation of a light emitting diode, the tertiary winding is used to control, increase or reduce, the base current of the oscillating transistor by connecting the tertiary winding to the light emitting diode, the current I0 supplied from the battery is not supplied as a base current to the base transistor and is, however, cancelled out by the current (−I3) when counter electromotive force is generated across the tertiary winding. That is to say, the battery wastes power by letting the current I0 to flow. Besides the current I0 is rather large as the resister used in the circuit through which the current I0 flows has a relatively low resistance such as 200 ohms. Accordingly, the electronic flash device described above unnecessarily consumes electric power and causes the battery to waste easily its power. In the case where a current is directly supplied as a base current to the oscillating transistor from the battery by way of a resister having resistance of about 200 ohms in place of amplifying the amplitude of a base current of the oscillating transistor through the tertiary winding, the oscillating transistor remains turned ON and does not implement oscillation. Otherwise, in the case where a current is supplied as a base current to the oscillation transistor from the battery through a resister having a high resistance of, for example, 1 K ohms, while the oscillating transistor implements oscillation, it is turned nonconductive with counter electromotive force generated across the secondary winding. In consequence, when the counter electromotive force across the secondary winding becomes weak due to a rise in the charged voltage of the main capacitor to a somewhat high level, the oscillating transistor remains conductive due to a reduction in amplitude of the base current, as a result of which charging stops before the main capacitor attains a specified charged voltage and the oscillating transistor is continuously supplied with a current from the battery.

SUMMARY OF THE INVENTION

An object of the present invention is to provide an electronic flash device with a ready-to-flash indicator by a light emitting diode which is less expensive than a neon lamp.

Another object of the present invention is to provide an electronic flash device which provides a reduction in consumption of a battery.

The above objects of the present invention are achieved by an electronic flash device comprising an oscillating transformer which has a primary winding, a secondary winding and a tertiary winding connected to one another in inductive coupling and is operative to increase or decrease a primary current across the primary winding so as to generate induction currents across the secondary winding and the tertiary winding and thereby to charge the main capacitor of the electronic flash device with the secondary current across the secondary winding, an oscillating transistor operative to amplify the primary current in accordance with a base current supplied thereto, a controlling transistor operative to control the base current of the oscillating transistor in accordance with the secondary current that is supplied as a base current to the controlling transistor, a current limiting resistor operative to limit the base current that is supplied to the controlling transistor, and light emitting means, such as a light emitting diode, for emitting light which has one end connected to one of opposite ends of the tertiary winding and another end connected to a juncture between the secondary winding and the tertiary winding of the oscillating transformer, the light emitting diode being actuated to turn on when the main capacitor attains a specified charged voltage. In the electronic flash device, the controlling transistor amplifies an amplitude of the base current at the oscillating transistor and the tertiary winding of the oscillating transformer is solely used for actuation of the light emitting diode.

The electronic flash device may further comprising a light guide which has one end located adjacent to the light emitting means and another end capable of retractably protruding outside the camera from the inside of the camera and guiding light from the one to the other end. The light guide means may be protruded by a shift of operating means into a charging position in which the operating means causes the electronic flash device to be charged.

The electronic flash device thus structured provides a reduction in power consumption of the battery. A light emitting diode, which is less expensive, is installed as light emitting means for providing an indication of completion of charging the main capacitor, so as to offer the electronic flash device at low costs. Further, a conventional oscillating transfer having a tertiary winding can be employed as it is without making a design change, which is always desirable in terms of developing an electronic flash device and lowering costs for the development.

BRIEF DESCRIPTION OF DRAWINGS

The above and other objects and features of the present invention will be more clearly understood from the following detailed description in connection with a preferred embodiment thereof when reading in conjunction with the accompanying drawings, wherein the same reference numbers have been used to designate similar or same elements or parts throughout the drawings and in which.

DETAILED DESCRIPTION OF THE EMBODIMENTS

Figure 1:
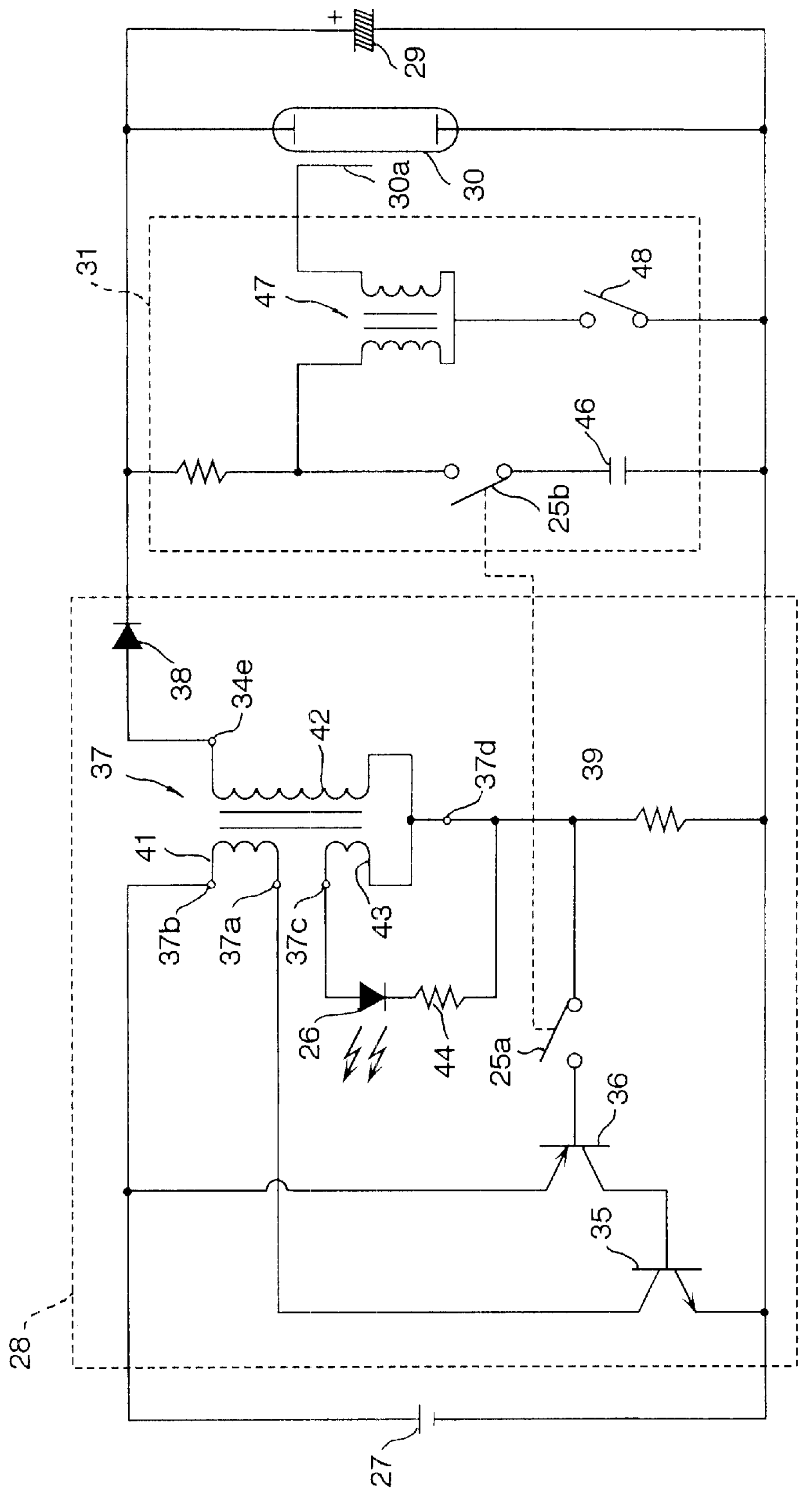
FIG. 1 is a schematic diagram illustrating circuitry of an electronic flash device of the invention.
Figure 2:
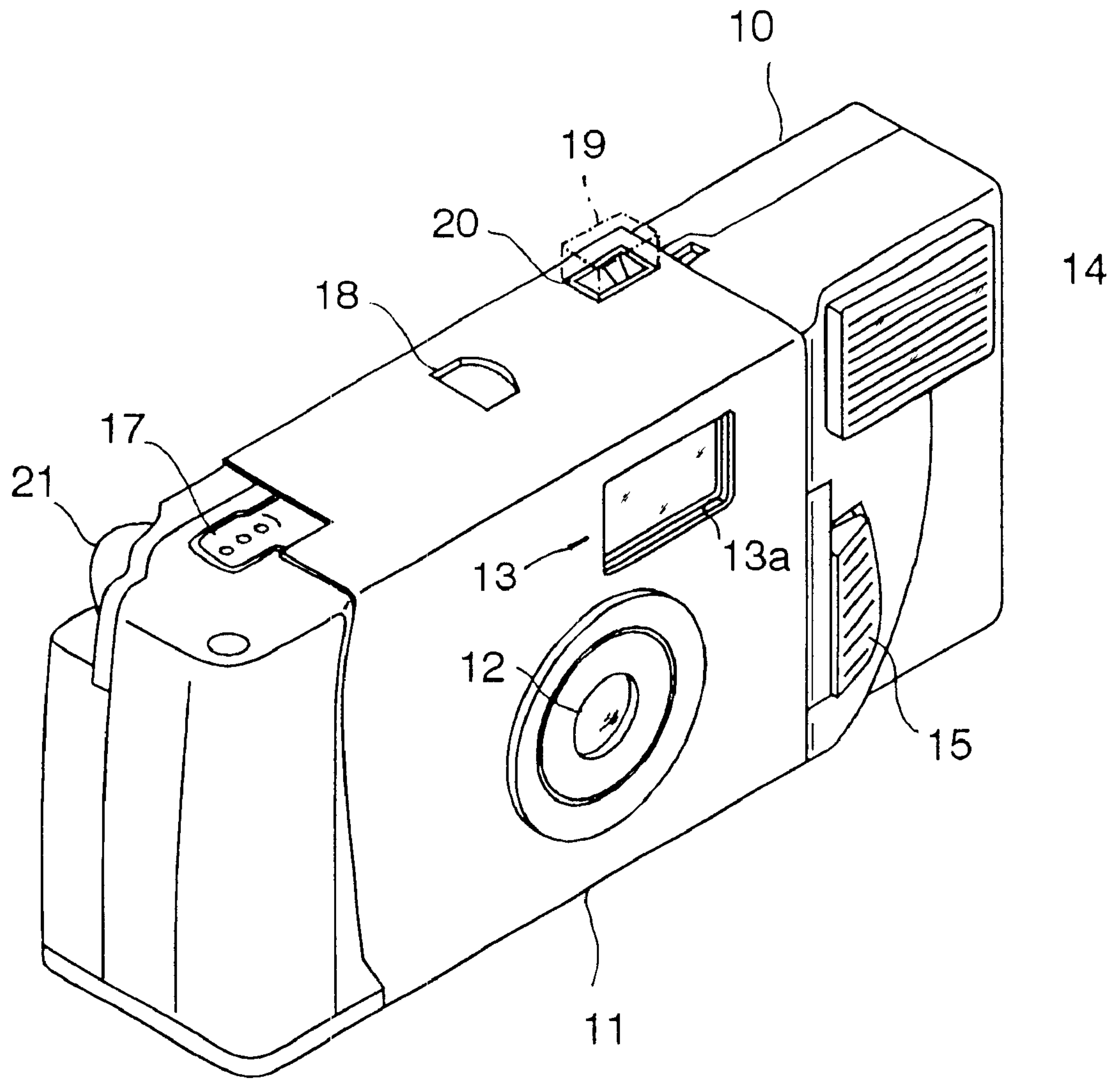
FIG. 2 is a perspective view illustrating a lens-fitted photo film unit.

Referring to the drawings in detail, and, in particular, to FIG. 2 which shows a lens-fitted film unit with an electronic flash device in accordance with a preferred embodiment of the invention, the lens-fitted film unit is constituted by a film unit casing 10, in which a taking lens, exposure mechanism, its associated mechanisms and elements necessary for taking picture and an electronic flash device are installed and is loaded with a photographic film cartridge. The film unit casing 10 is partly covered by a label 11. The film unit casing 10 is provided with a taking lens 12, a finder window 13*a* of a viewfinder 13, a flash window 14 and a slide switch 15 on its front wall, and a shutter release button 17, a counter window 18 in which the number of available exposure of a photographic film is indicated and an opening 20 through which a light guide 19 projects to provides an indication whether an electronic flash device is ready on its top wall. Further the film unit casing 10 is provided with a film winding knob 21 and an eyepiece window ( not shown ) of the viewfinder 13. The label 11 is of a sticker type and has openings for the taking lens 12, the viewfinder 13, the counter window 18 and other elements on the front wall. The slide switch 15, which is an ON-OFF switch, is operated when switching a charging switch 25*a* and a selecting switch 25*b* (see FIG. 1) for allowing the electronic flash device to flash. When moving the slide switch 15 up to its ON position, the charging switch 25*a* is turned ON to charge the electronic flash device and the selecting switch 25*b* is turned on to bring the electronic flash device ready to flash. On the other hand, when moving the slide switch 15 down to its OFF position, the charging switch 25*a* is turned OFF to stop charging the electronic flash device and the selecting switch 25*b* is turned OFF to prohibit the electronic flash device from flashing. A click mechanism may be provided to prevent the slide switch 15 from getting out of ON or OFF position.

The light guide 19 is linked with the slide switch 15 so as to change its position between a position where it protrudes from the top wall of the film unit casing 10 when the slide switch 15 moves to the ON position, and a position where it retracts into the inside of the film unit casing 10 when the slide switch 15 moves to the OFF position. LED 26 (see FIG. 1) is disposed on a circuit board facing an end of the light guide 19 so that light emanating from LED 26 when the electronic flash device is charged up is seen through the light guide 19. The light from LED 26 is also guided to a check window (not shown) disposed close to the eyepiece window of the viewfinder 13 so as to provide the photographer with the indication that the electronic flash device is ready to flash while framing in the viewfinder 13.

Referring to FIG. 1 showing an electronic flash device in accordance with a preferred embodiment of the invention, the electronic flash device includes a battery 27, a booster circuit 28, an electrolytic main capacitor 29, a flash discharge tube 30, a trigger circuit 31 and LED 26. The battery 27 usually used is a dry battery having electromotive force of 1.5 volts. The booster circuit 28 is constituted by a charging switch 25*a,* an NPN-type of oscillating transistor 35, a PNP-type of controlling transistor 36, an oscillating transformer 37, a rectifier diode 38 and a current limiting resistor 39. The oscillating transistor 35 is oscillated by positive feedback operation of the oscillating transformer 37 to produce high voltage in the secondary winding which is sufficient to charge the main capacitor 29. The charging switch 25*a* is turned ON when the slide switch 15 is moved up to the ON position. The oscillating transformer 37 is formed by a primary winding 41, a secondary winding 42 and a tertiary winding 43 which are connected to one another in inductive coupling. One end of the secondary winding 42 and one end of the tertiary winding 43 has a common terminal. In the following explanations, the opposite terminals of the primary winding 41 are referred to as first terminal 37*a* and second terminal 37*b* respectively, one of the opposite terminals of the secondary winding 32 is referred to as a fifth terminal 37*e*, the common terminal of the secondary winding 42 a and the tertiary winding 43 is referred to as a fourth terminal 37*d* and the other terminal of the tertiary winding 43 is referred to as a third terminal 37*c*. The first terminal 37*a* of the primary winding 41 is connected to a collector of the oscillating transistor 35, and the second terminal 37*b* of the first winding 37 is connected to the positive electrode of the battery 27. An emitter of the oscillating transistor 35 is connected to the negative electrode of the battery 27 and grounded. A base of the oscillating transistor 35 is connected to a collector of the controlling transistor 36 which controls a base current of the oscillating transistor 35.

The controlling transistor 36 has an emitter connected to the positive electrode of the battery 27, a collector connected to the base terminal of the oscillating transistor 35 and a base connected to the negative electrode of the battery 27 by way of the charging switch 25*a* and the current limiting resistor 39 and also connected to the fourth terminal 37*d* of the oscillating transformer 37. The fifth terminal 37*e* of the secondary winding 42 is connected to a positive electrode of a main capacitor 29 which is grounded at its negative electrode by way of a rectifier diode 38. The rectifier diode 38 has an anode connected to the fifth terminal 37*e* of the secondary winding 42. The oscillating transistor 35 turns ON when applied with a voltage of the battery 27 at the base by way of a juncture between the emitter and collector of the controlling transistor 36 when the controlling transistor 36 turns on. When the oscillating transistor 35 turns ON, a collector current that is supplied from the battery 27 starts to flow through the primary winding 41 as a primary current increases, as a result of which the oscillating transformer 37 causes the positive feedback action to increase a base current to the controlling transistor 36, which is accompanied by a further increase in the primary current. While the primary current flowing through the primary winding 41 is increasing, an electromotive force, whose voltage becomes higher, for example, 350 volts, corresponding to a ratio of the number of turns between the primary winding 41 and the secondary winding 42, is generated in the secondary winding 42. The electromotive force across the secondary winding 42 produces a secondary current through the rectifier diode 38 so as to charge the main capacitor 29. When the primary current is saturated and stops increasing, a counter electromotive, which has just force opposite in direction to the electromotive force, is generated in the secondary winding 42. The controlling transistor 36 turns ON when a current starts to flow through the base by way of the charging switch 25 and the limiting resistor 39 after closing the charging switch 25. The limiting resistor 39 is operative to limit the base current supplied from the battery 27 to a small level just enough to cause the controlling transistor 36 to turn ON. On the grounds of this, the limiting resistor 39 with a relatively large resistance value is employed in this embodiment.

The controlling transistor 36 increases the base current of the oscillating transistor 35 with an increase in the base current of the controlling transistor 36 by the electromotive force across the secondary winding 42 that is caused due to by an increase in the primary current provided by the oscillating transistor 35. When the primary current reaches a saturation level and stops increasing, a counter electromotive force is generated in the secondary winding 42. This counter electromotive force applies a reverse bias to the base terminal of the controlling transistor 36, so as to turn it OFF with the result of reducing the base current of the oscillating transistor 35 to zero and turning it OFF. In this manner, oscillation is continued by reliably turning OFF the oscillating transistor 35 even when the counter electromotive force becomes weak according to an increase in charged voltage of the main capacitor 29 while amplifying the amplitude of the base current of the oscillating transistor 35 according to a level of the electromotive force or the counter electromotive force generated in the secondary winding 42 so as to oscillate the oscillating transistor 35 through the controlling transistor 36. The main capacitor 29 is connected at its opposite terminals to opposite electrodes of the flash discharge tube 30, respectively. Further the main capacitor 29 is connected at a negative terminal to the negative electrode of the battery 27 which is grounded and at a positive terminal to a cathode of the rectifier diode 38. The main capacitor 29 is charged positively so as to increase the level of voltage at the positive terminal from the negative voltage of the battery 27 as a reference value. The electronic flash device of this embodiment is designed and adapted to flash with a design intensity when the main capacitor 29 is charged up to a reference charged voltage of, for example, 300 volts. LED 26 for providing an indication of completion of charging the main capacitor 29 which is less expensive than the conventional neon lamps is employed Specifically, In particular, LED 26 used in this example is general one that has a rise voltage Vf of, for example, 1.5 volts and an active voltage of, for example, approximately 2 volts for stable light emission. For this reason, since the battery 27 is too low in power to turn ON LED 26 directly, the electronic flash device is adapted to cause LED 26 to turn ON with a voltage from the tertiary winding 43 which changes in proportion to the charged voltage of the main capacitor 29. A resistor 44 is connected to LED 26 to adjust the level of a current flowing through it. LED 26 is connected at its anode to the third terminal 37*c* of the tertiary winding 43 and at its cathode to the fourth terminal 37*d* by way of the resistor 44. LED 26 is driven with a potential difference between a potential V3 of the third terminal 37*c* and a potential V4 of the fourth terminal 37*d*, i.e. a voltage across between the third terminal 37*c* and the fourth terminal 37*d* (V3–V4). Taking a voltage (0 volt) at the negative electrode of the battery 27 as a reference voltage, while each of the windings 41, 42 and 43 generates electromotive force, the potential V4 at the fourth terminal 37*d* is constant regardless of a charged voltage of the main capacitor 29, and the potential V3 of the third terminal 37*c* increases proportionally as the charged voltage of the main capacitor 29 increases. The increase in the potential V3 is caused due to an increase in the potential at the fifth terminal 37*e* of the secondary winding 42 with an increase in the charged voltage of the main capacitor 29 and the inductive coupling of the secondary winding 42 and the tertiary winding 43.

At the beginning of charging the main capacitor 29, in other words, until the main capacitor 29 attains a predetermined charged voltage of, for example, 265 volts which is necessary to actuate LED 26 for providin an indication (which is hereafter referred to as a actuation voltage), the LED 26 is not actuated because the voltage across between the third terminal 37*c* and the fourth terminal 37*d* (V3–V4) is a reverse voltage with respect to LED 26 or the voltage across between the third terminal 37*c* and the fourth terminal 37*d* (V3–V4) is too small, i.e. smaller than the rise voltage Vf, for LED 26 to turn ON although it is a normal voltage with respect to LED 26. When the main capacitor 29 attains the actuation voltage or higher, the voltage between the third terminal 37*c* and the fourth terminal 37*d* (V3–V4) becomes higher while the electromotive force is present at the tertiary winding 43, a normal voltage higher than the rise voltage Vf is applied to LED 26, so as to turn ON LED 26 whenever electromotive force occurs at the tertiary terminal 43. In this instance, when counter electromotive force occurs across the tertiary winding 43, LED 26 never turns ON regardless of the charged voltage value of the main capacitor 29 due to a reverse voltage across between the third terminal 37*c* and the fourth terminal 37*d* (V3–V4). When the main capacitor 29 almost attains a specified charged voltage, the oscillating transistor 35 and the oscillating transformer 37 oscillate at very high frequency of approximately 10 KHz, so as to make LED 26 appear to emit the light like continuously to the naked eye. The charging switch 25*a* is linked with the selecting switch 25*b* so as to have the same ON and OFF statuses. Therefore, emission of light from LED 26 provides the photographer with an indication that the electronic flash device is caused to flash without fails when making exposure while LED 26 remains continuously turned ON or the electronic flash device is never actuated even when making exposure while LED 26 remains turned OFF.

As described above, the electronic flash device of the present invention employs the controlling transistor 36, in place of using the tertiary winding 43, for amplifying the amplitude of the base current of the oscillating transistor 35 to cause oscillating transistor 35 to oscillate. Also a current 10 that is supplied from the battery 27 by way of the tertiary winding 43 in the conventional manner corresponds to emitter current of the controlling transistor 36 that is supplied from the battery 27, namely the base current of the controlling transistor 36 and the base current of the oscillating transistor 35 in this embodiment and the base current of the controlling transistor 36, however, is set lower in level by using the limiting resistor 39 which has relatively large resistance so as thereby to restrict a current flow. While the controlling transistor 36 remains turned OFF due to a counter electromotive force occurring across the secondary winding 42, the oscillating transistor 35 is not supplied with a current at the base. In consequence, the battery 27 consumes less power in comparison with the conventional manner.

The electronic flash device of the present invention can utilize a conventional transformer with primary, secondary and tertiary windings the oscillating transformer 37 for charging of the main capacitor 29 and indication of completion of charging of the main capacitor by the use LED 26, which eliminates it unnecessary to design a new oscillating transistor for the oscillating transistor 37, so as to decrease development costs. The utilization is made of LED 26 in place of a neon lamp for providing an indication of completion of charge of the min capacitor, so that the electronic flash device is made correspondingly less expensive.

A trigger circuit 31 includes the selecting switch 25*b*, a trigger capacitor 46, a trigger winding 47 and a synchronous switch 48. The trigger capacitor 46 is charged with a secondary current supplied from the secondary winding 42 of the booster circuit 28 like the main capacitor 29. The synchronous switch 48 is turned ON in response to full opening of the shutter blade. When the synchronous switch 48 turns ON while the selecting switch 25*b* remains ON, When the synchronous switch 48 is turned on while the emission selecting switch 25*b* remains turned ON, the trigger capacitor 46 discharges, and the discharge current flows into the primary winding of the trigger transformer 47, so as to generate a high voltage of, for example, 4K volts across the secondary winding thereof as a trigger voltage. Then the trigger voltage is applied to the flash discharge tube 30 through a trigger electrode 30*a*. The applied trigger voltage breaks electrical insulation in the flash discharge tube 30 with the result of causing the main capacitor 29 to discharge through the flash discharge tube 30, so that the electronic flash device flashes. As described above, the selecting switch 25*b* is turned ON or OFF responding to operation of the slide switch 15 to ON or OFF position, respectively. The trigger capacitor 46 is allowed to discharge while the selecting switch 25*b* remains turned ON, so that the electronic flash device is allowed to flash. On the other hand, the trigger capacitor 46 is prohibited from discharging because the synchronous switch 48 is turned ON even while the selecting switch 25*b* remains turned ON, so that the electronic flash device is prohibited from flashing.

The following description will be directed to a sequential operation which occurs in the electronic flash device when the photographer takes a picture. The shutter mechanism is charged to bring the camera ready for exposure when the film winding wheel 21 (shown in FIG. 2) of the lens-fitted film unit is rotated by the photographer. In the case of intending flash exposure, the slide switch 15 is shifted into the ON position regardless of the status of a charged voltage of the main capacitor 29, or otherwise the slide switch is shifted into the OFF position. Usually, the slide switch 15 remains unchanged in position until completing exposure. For example, when making flash exposure, upon a shift of the slide switch 15 to the ON position, the charging switch 25*a* is turned ON and the selecting switch 25*b* is also turned ON. Then the controlling transistor 36 is turned conductive when its base current starts to flow by way of the charging switch 25*a* and the current limiting resistor 39. As the limiting resistor 39 has a relatively large resistance value, the base current of the controlling transistor 36 is small. When the controlling transistor 36 turns conductive, the oscillating transistor 35 is supplied with a base voltage by the battery 27, so as to turn conductive, as a result of which a collector current corresponding to the base current starts to flow through the primary winding 41 as a primary current and, in consequence, generate electromotive force across the secondary winding 42. A ratio of the electromotive force relative to the voltage in the primary winding 41 is equal to the ratio of the number of turns between the secondary winding and the primary winding. The electromotive force causes the secondary winding 42 to generate a secondary current which flows to the main capacitor 29 from the fifth terminal 37*e* through the rectifier diode 38, so as to charge it. The electromotive force causes a reduction in the base voltage of the controlling transistor 36 with an effect of increasing a base current. The increased base current provides an increases in the collector current which is accompanied by an increase in the base current of the oscillating transistor 35, so as to increase the primary current of the oscillating transistor 35. As described above, the oscillating transistor 35 amplifies the primary current through the positive feedback at the secondary winding 42 of the oscillating transformer 37, so that the primary current reaches its maximum level instantaneously. When the primary current reaches the maximum level, that is to say, when the increase in the primary current stops, counter electromotive force occurs across each of the windings 41, 42 and 43.

Upon an occurrence of the counter electromotive force across the secondary winding 42, this counter electromotive force is applied as a reverse bias to the controlling transistor 36, so as thereby to increase the base voltage with an effect of a reduction in the base current. As a result, the controlling transistor 36 causes a reduction in the collector current, that is, the oscillating transistor 35 causes a reduction in the base current. With a reduction in the base current of the oscillating transistor 35, the oscillating transformer 37 increases the counter electromotive force across the secondary winding 42 due to the reduction in the primary current and, in consequence, the controlling transistor 36 causes a further decrease in the base current. In this manner, the controlling transistor 36 is turned nonconductive instantaneously after the maximum level of primary current is reached, so as to cut off the base current of the oscillating transistor 35, thereby turning the oscillating transistor 35 nonconductive. When the counter electromotive force disappears from the secondary winding 42 as a result that the oscillating transistor 35 is turned nonconductive, the the controlling transistor 36 receives a base current from the battery 27, so as to continue the oscillation in the booster circuit.

During oscillation of the booster circuit 28, a current supplied to the base of the controlling transistor 36 from the battery 27 is almost nothing because the current is reversely biased between the emitter and the base of the controlling transistor 36 while the counter electromotive force is present across the secondary winding 42. Further, as mentioned above, a current supplied as a base current to the oscillating transistor 35 from the battery 27 is shut off immediately when the controlling transistor 36 turns nonconductive due to generation of the counter electromotive force across the secondary winding 42. More specifically, the current supplied as the base current to the oscillating transistor 35 from the battery 27 is shut off due not to cancellation by another current but to control by the controlling transistor 36. Consequently, because power consumption of the battery 27 is almost nothing during an interval between generation of counter electromotive force and subsequent generation of electromotive force across the secondary winding 42, the power consumption is lowered as compared to the case where the tertiary winding 43 is used to directly amplify the amplitude of a base current of the oscillating transistor 35. The main capacitor 29 gradually increases its charged voltage as it is charged with the secondary current which flows through the secondary winding 42 during presence of electromotive force across the secondary winding 42. The trigger capacitor 46 is also charged with the secondary current since the selecting switch 25*b* remains turned ON. Although the counter electromotive force appearing across the secondary winding 42 become weak with an increase in the charged voltage of the mail capacitor 29, the oscillating transistor 35 never remains conductive because the base current is amplified through the controlling transistor 36. Therefore the booster circuit 28 keeps oscillation even when the charged voltage of the main capacitor 29 becomes high. On the other hand, while the electromotive force is present across the tertiary winding 43 during oscillation of the booster circuit 28, the potential V4 at the fourth terminal 37*d* is constant when taking the potential (0 V) at the negative electrode of the battery 27 as a reference voltage and it jumps up for a moment like a pulse. when the counter electromotive force appears. The potential V3 at the third terminal 37*c* is constant for a period of time in which electromotive force is present across the tertiary winding 43 and drops for a moment like a pulse but when the counter electromotive force appears.

As the main capacitor 29 lifts a charged voltage following progress of charging, the frequency of oscillation of the booster circuit 28 becomes high, so that a time interval between generation of electromotive force and subsequent counter electromotive force gradually becomes short. The potential V3 at the third terminal 37*c* becomes high as a whole accompanying a proportional variation as the main capacitor 29 lifts a charged voltage as described above. On the other hand, the potential V4 at the fourth terminal 37*d* upon an occurrence of electromotive force or counter electromotive force remains unchanged regardless of a rise in the charged voltage of the main capacitor 29. When the main capacitor 29 further lifts the charged voltage, the potential V3 at the third terminal 37*c* becomes higher than the potential V4 at the fourth terminal 37*d* while electromotive fore is present across the tertiary winding 33. However LED 26 is not actuated to emit light before the min capacitor 29 lifts a charged voltage to the specified actuation voltage.

After the charged voltage of the main capacitor 29 reaches the actuation voltage, the voltage difference (V3–V4) between the third and fourth terminals 37*c* and 37*d* during presence of electromotive force across the tertiary winding 43 becomes sufficiently high to provide LED 26 with a voltage higher than the rise voltage Vf through the resistor 44. Thus LED 26 is actuated to emit light whenever electromotive force appears across the tertiary winding 43. When the charged voltage of the main capacitor 29 lifts the charged voltage to the actuation voltage, the time interval of generation of electromotive force becomes shorter and the potential V3 at the third terminal 37*c* becomes further lower, so that the voltage difference (V3–V4) between the third and fourth terminals 37*c* and 37*d* becomes higher, as a result of which LED 26 emit light with satisfactory stability and brightness.

When the photographer sees a bright light indication of LED 26, either through the light guide 19 which protrudes its top end from the top wall of the film unit casing 10 in cooperation with operation of the slide switch 15 or through the check window disposed close to the eyepiece of the viewfinder 13, the photographer depresses the shutter release button 17 to make exposure. Following the depression of the shutter release button 17, the shutter blade opens and, when reaching a full position, actuate the synchronous switch 48 to turn ON. At this point of time, since the selecting switch 25*b* remains closed, the synchronous switch 48 causes the trigger capacitor 46 to discharge, so that the trigger transformer 47 at the secondary winding generates a trigger voltage and supplies it to the flash discharge tube 30. As a result, the main capacitor 29 discharges through the flash discharge tube 30 to flash. The flash light emission is directed toward an aimed subject through the flash window 14 to illuminate objects. As the slide switch 15 stays in the ON position, the booster circuit 28 keeps re-charging the main capacitor 29 after completion of flash exposure. However, LED 26 remains turned OFF at the beginning of re-charging and is turned ON again when the main capacitor 29 gains the actuation voltage.

In the case of making exposure without a flash, the slide switch 15 is shifted down to the OFF position. Shifting the slide switch 15 to the OFF position is allowed at any time, even during charging the main capacitor 29 or after completion of charging the main capacitor 29. When the slide switch 15 is shifted down to the OFF position during charging the main capacitor 29, both charging switch 25*a* and selection switch 25*b* are turned OFF, which stops supply of a current to the base of the controlling transistor 36 from the battery 27, then the booster circuit 28 interrupts oscillation to interrupt charging the main capacitor 29. In consequence, LED 26 is turned OFF in response to the interruption of oscillation of the booster circuit 28 even while the main capacitor 29 is charged sufficiently high to actuate LED 26 and terminated in charging. Through the sequential operation, the photographer can notice it from disappearance of light emission of LED 26 without confirming the position of the slide switch 15 that the electronic flash device is prohibited from flashing. The synchronous switch 48 is actuated by the shutter blade running to the full position in response to depression of the shutter release button 17. However, as the selecting switch 25*b* remains turned OFF, the trigger capacitor 46 never discharges. As a result, even if the main capacitor 29 attains a sufficiently high charged voltage to flash, the electronic flash device never flashes as long as the slide switch 15 remains in the OFF position. Thus exposure is made without a flash even after having the electronic flash device ready to flash.

Figure 3:
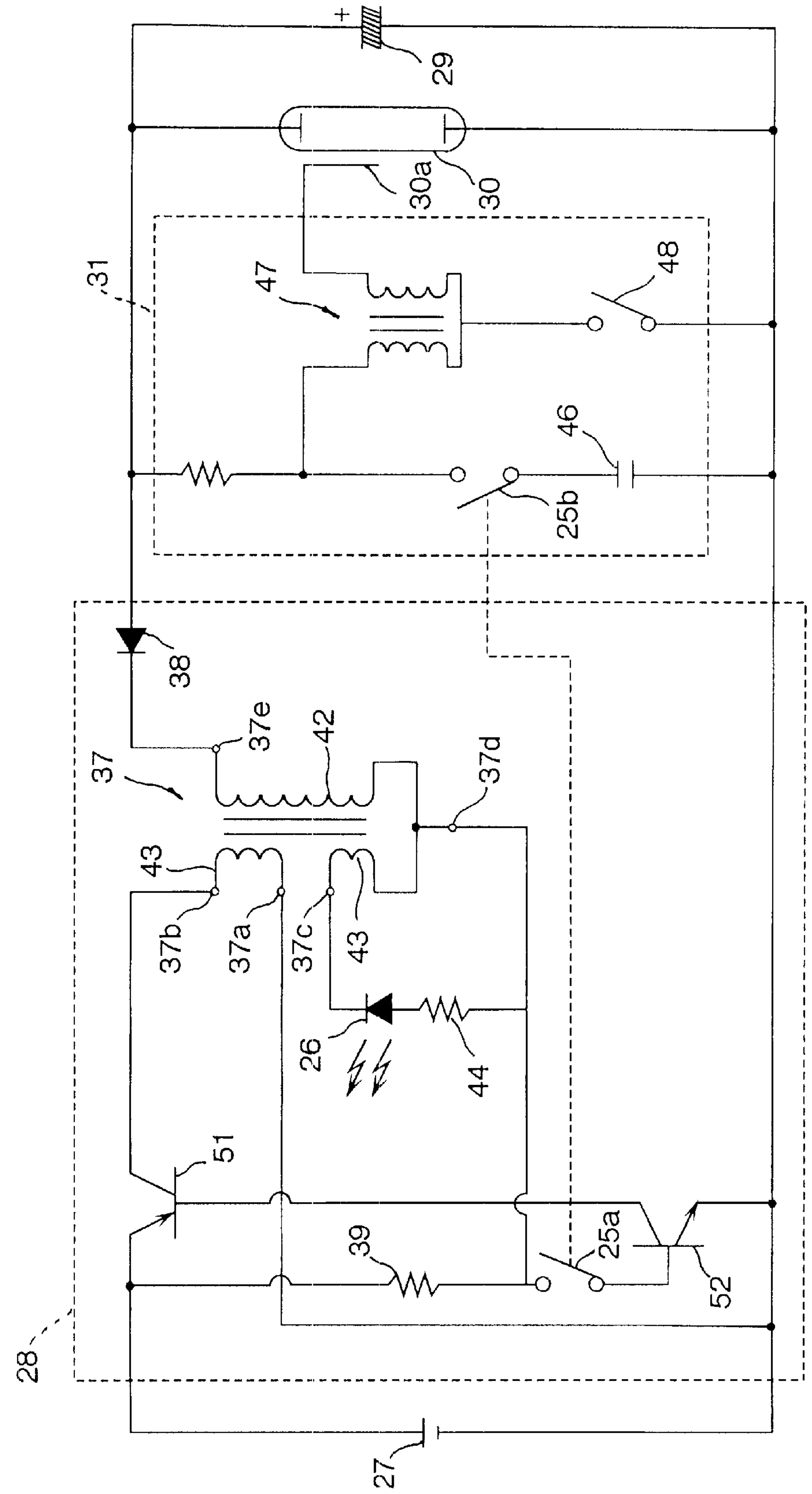
FIG. 3 is a schematic diagram illustrating circuitry of an electronic flash device of the invention where a negative charging is made.

FIG. 3 shows an electronic flash device in accordance with another embodiment of the present invention which charges a main capacitor with negative charge. In FIG. 3, elements which are similar or substantially the same in operation and structure as those of the previous embodiment are designated by the same reference numerals and no specific description is omitted for the elements.

In this embodiment, PNP type of transistor is employed for an oscillating transistor 51 which has an emitter connected to a positive electrode of a battery 27, a collector connected to a second terminal 37*b* of a primary winding 41 of a oscillating transformer 37 and a base connected to a collector of a controlling transistor 52. NPN type of transistor is also employed for the controlling transistor 52 which has an emitter connected to a negative electrode of the battery 27 which is grounded, a base connected to both fourth terminal of the oscillating transformer 37 and one of opposite ends of a limiting resistor 39 through a charging switch 25*a*. The other end of the limiting resistor 39 is connected to the positive electrode of the battery 27. The primary winding 41 has turns in a direction opposite to that of the turns of the corresponding winding of the previous embodiment, and both main capacitor 29 and rectifier diode 38 are connected in a direction opposite to that of the corresponding capacitor and diode of the previous embodiment. Further LED 26 is connected in a direction opposite to that of corresponding one of the previous embodiment so as to have a cathode connected to a third terminal 37*c* of the tertiary winding 43. By employing this connection, a potential of the third terminal 37*c* is lowered as a charged voltage of the main capacitor 29 is increased when the main capacitor 29 is charged wit negative charge to lower the potential at its negative terminal, which is connected to the fifth terminal of a secondary winding 42 of the oscillation transformer 37 through the rectifier diode 38. The charged voltage of the main capacitor 29 under the negative charging is defined as a potential at the positive terminal of the main capacitor 29 which is measured with a potential at the negative terminal as a reference voltage.

Figure 4:
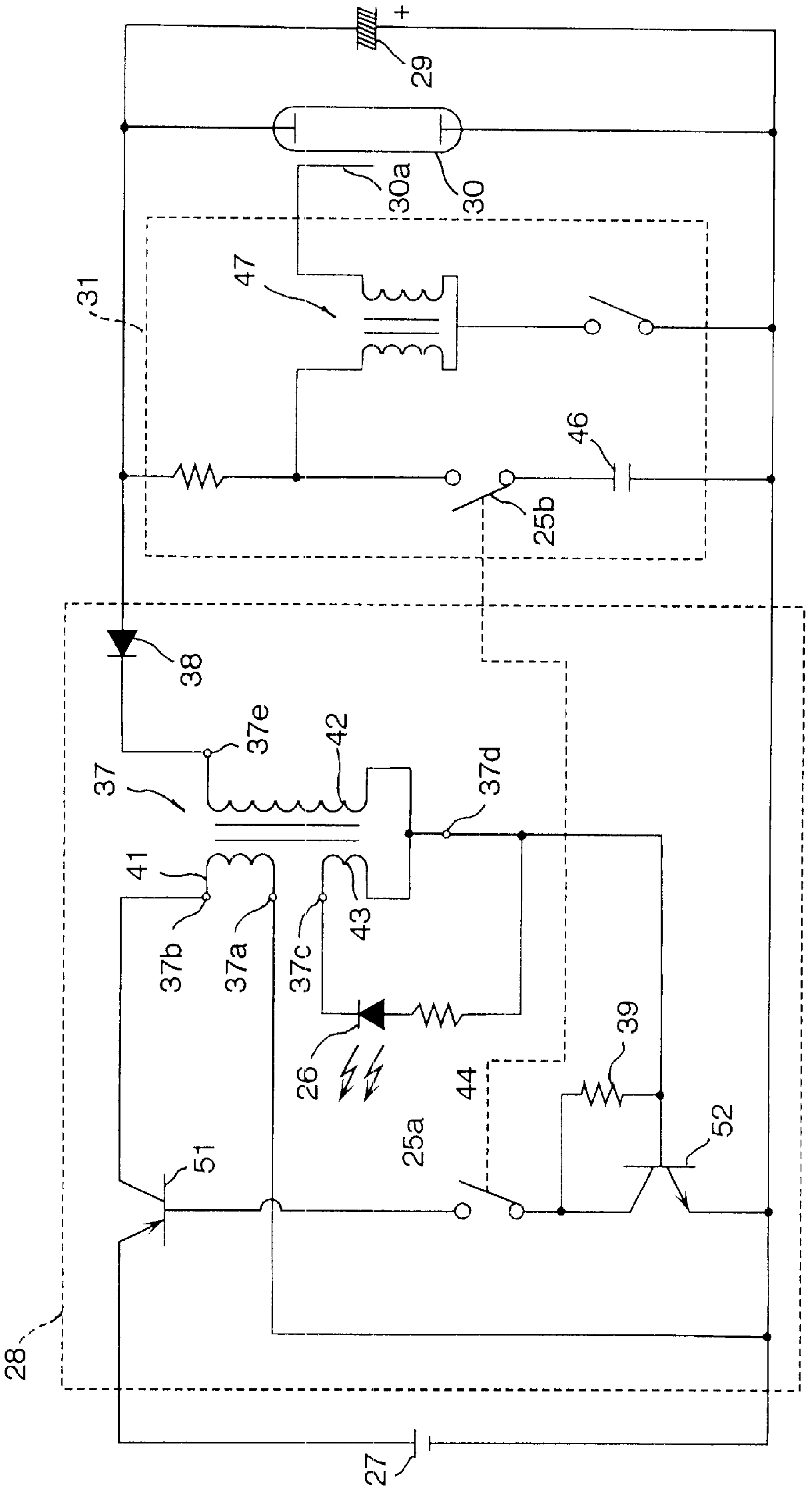
FIG. 4 is a schematic diagram illustrating circuitry of an electronic flash device of the invention where a base current of a controlling transistor is supplied from a battery by way of an oscillating transistor.

FIG. 4 shows an electronic flash device in accordance with another embodiment of the present invention which is almost the same as the embodiment illustrated in FIG. 3 excepting that the base of the controlling transistor 52 is connected to the base of the oscillating transistor 51 through the limiting resistor 39 and the charging switch 25*a*. In this embodiment, a voltage applied to the limiting resistor 39 and the base of the controlling transistor 52 is lowered by a voltage between the emitter and the base of the oscillating transistor 51. However, operation of the circuit is similar to that of the previous embodiment.

Figure 5:
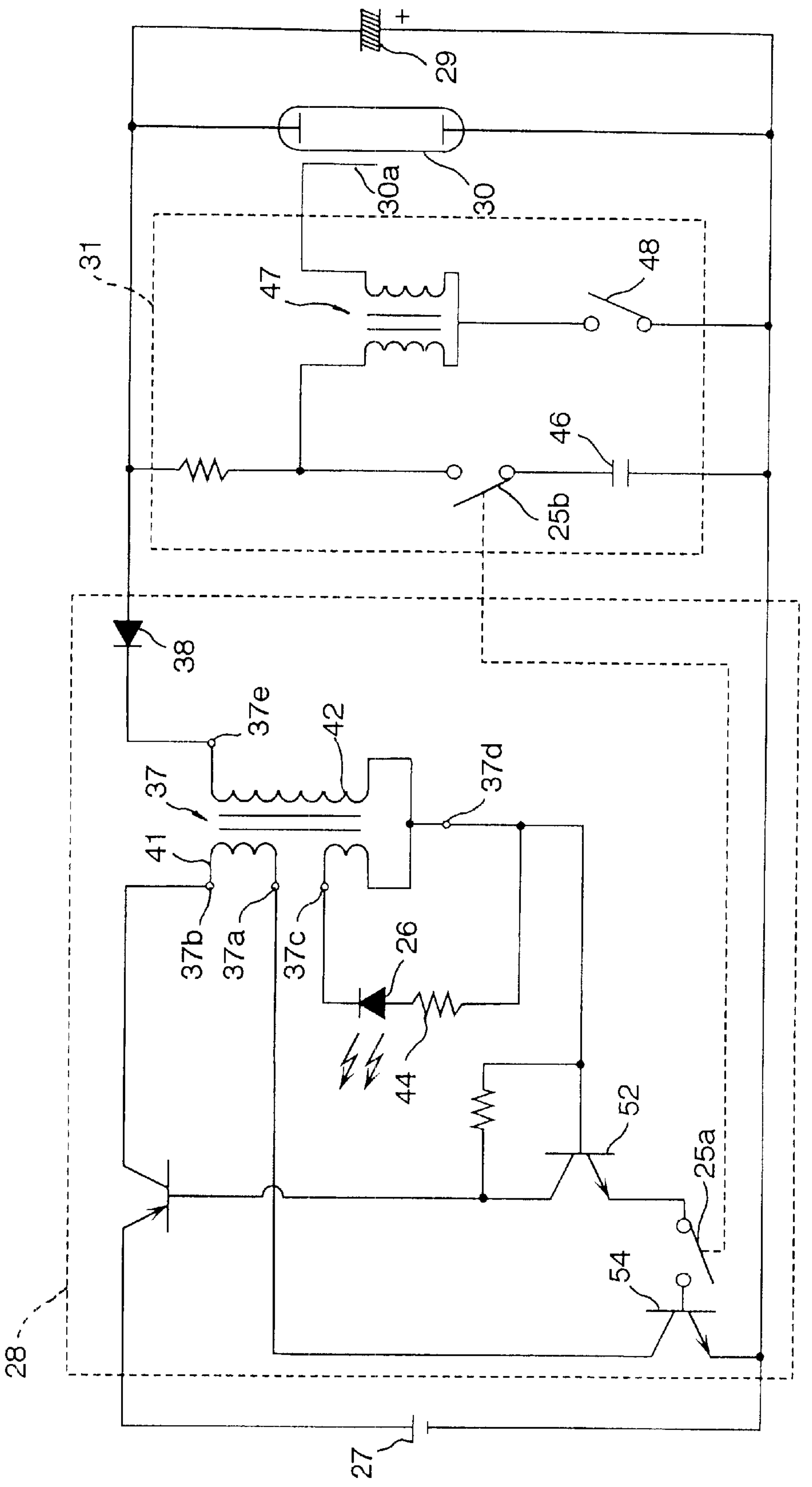
FIG. 5 is a schematic diagram illustrating circuitry of an electronic flash device of the invention where NPN type transistor is used as an oscillating transistor.
Figure 6:
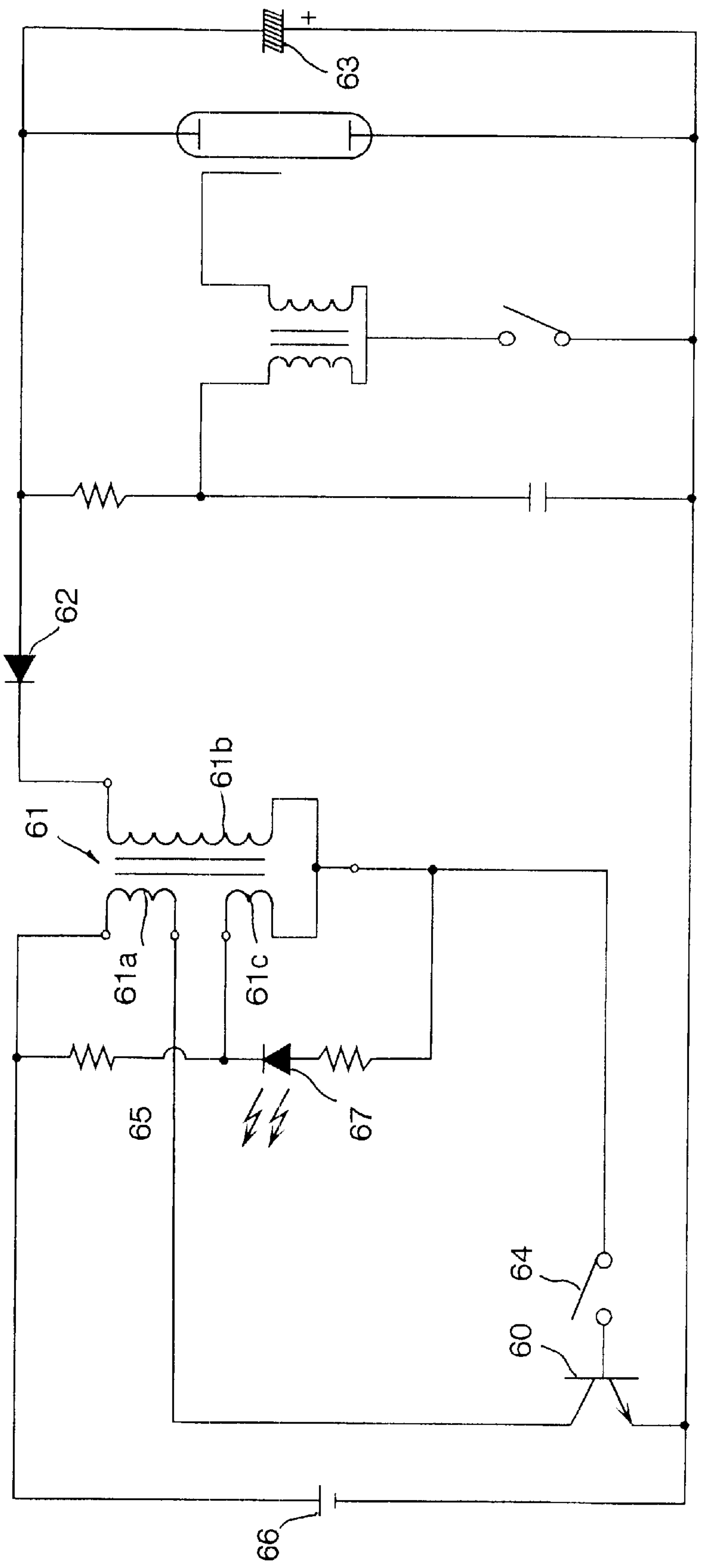
FIG. 6 is a schematic diagram illustrating circuitry of a conventional electronic flash device.

FIG. 5 shows a negative charging type of electronic flash device in accordance with another embodiment of the present invention in which NPN type of transistor is employed for an oscillating transistor 54 which has a collector connected to a first terminal 37*a* of the primary winding 41 of the oscillation transformer 37 and an emitter connected to the negative electrode of the battery 27. The emitter of the controlling transistor 52 is connected to the base of the oscillating transistor 54 to control a base current of the oscillating transistor 54. A charging switch 25*a* is located between the emitter of the controlling transistor 52 and the base of the oscillating transistor 54. In all the above embodiments, the slide switch 15 may be replaced with a switch member of a type that keeps the charging switch 25*a* turned ON only while the switch member remains depressed. Although the above description of the invention has been made with respect to the electronic flash device as installed in a lens-fitted film unit, the electronic flash device of the present invention may be provided as a built-in type or as a detachable type.

Although the present invention has been fully described by way of the preferred embodiments thereof with reference to the accompanying drawings, it is to be noted that various other variants and embodiments are apparent to those skilled in the art. Therefore unless otherwise such variants and embodiments depart from the true scope of the present invention, they should be construed as included therein.

What is claimed is:

1. An electronic flash device having a main capacitor for a photographic camera, which comprises:

an oscillating transformer having a primary winding, a secondary winding and a tertiary winding which are connected to one another in inductive coupling, said oscillating transformer being operative to increase or decrease a primary current across said primary winding so as to generate induction currents across said secondary winding and said tertiary winding and thereby to charge said main capacitor of the electronic flash device with said secondary current across said secondary winding;

an oscillating transistor operative to amplify said primary current in accordance with a base current supplied thereto;

a controlling transistor operative to control said base current of said oscillating transistor in accordance with said secondary current that is supplied as a base current to said controlling transistor;

a current limiting resistor operative to limit said base current that is supplied to said controlling transistor, and light emitting means for emitting light, said light emitting means having one end connected to one of opposite ends of said tertiary winding and another end connected to a juncture between said secondary winding and said tertiary winding of said oscillating transformer, said light emitting means being actuated to turn on when said main capacitor attains a specified charged voltage;

wherein said controlling transistor amplifies an amplitude of said base current at said oscillating transistor and said tertiary winding of said oscillating transformer is solely used for actuation of said light emitting means.

2. An electronic flash device as defined in claim 1, wherein said light emitting means comprises a light emitting diode.

3. An electronic flash device as defined in claim 1, and further comprising a light guide for guiding light from one of opposite ends to another end, said one end being located adjacent to said light emitting diode and said another end being retractably protruding the outside of the camera from the inside of the camera.

4. An electronic flash device as defined in claim 3, and further comprising shiftable operating means for causing said electronic flash device to be charged when shifting into a charging position from a rest position, wherein said light guide means is protruded by a shift of said operating means into said charging position.

* * * * *